(12) United States Patent
Gruber

(10) Patent No.: US 11,359,397 B2
(45) Date of Patent: Jun. 14, 2022

(54) DEVICE FOR DISINFECTING WATER

(71) Applicant: Egon Gruber, Graz (AT)

(72) Inventor: Egon Gruber, Graz (AT)

( * ) Notice: Subject to any disclaimer, the term of this patent is extended or adjusted under 35 U.S.C. 154(b) by 0 days.

(21) Appl. No.: 16/276,485

(22) Filed: Feb. 14, 2019

(65) Prior Publication Data
US 2019/0177994 A1 Jun. 13, 2019

Related U.S. Application Data

(63) Continuation-in-part of application No. 15/112,812, filed as application No. PCT/AT2015/050018 on Jan. 20, 2015, now abandoned.

(30) Foreign Application Priority Data

Jan. 21, 2014 (AT) ..................................... A 39/2014

(51) Int. Cl.
*E04H 4/12* (2006.01)
*C02F 1/32* (2006.01)
(Continued)

(52) U.S. Cl.
CPC ........... *E04H 4/1209* (2013.01); *C02F 1/325* (2013.01); *C02F 1/78* (2013.01); *E04H 4/1281* (2013.01);
(Continued)

(58) Field of Classification Search
None
See application file for complete search history.

(56) References Cited

U.S. PATENT DOCUMENTS 3,550,782 A 12/1970 Veloz
3,924,139 A * 12/1975 Hirose .................... C02F 1/325
422/186.3
(Continued)

FOREIGN PATENT DOCUMENTS

EP 2 527 302 A1 11/2012
JP 2006 255596 A 9/2006
(Continued)

OTHER PUBLICATIONS

International Search Report in application No. PCT/AT2015/050018 dated Jun. 2, 2015.
(Continued)

*Primary Examiner* — Jonathan M Peo
(74) *Attorney, Agent, or Firm* — Maschoff Brennan

(57) ABSTRACT

A device is provided for disinfecting water of a swimming pool, which includes an inlet for water from the swimming pool and an outlet for the water, an ozonation device, and a mixing section for ozone-containing water, wherein the ozonation device includes at least one UV light source for generating ozone, and an admixing unit for admixing the ozone to the water of the inlet, and the mixing section comprises a housing connected to the inlet, wherein the UV light source is arranged within the housing to emit UV light into the housing interior. The housing has deflecting surfaces for water protruding into the housing interior, which ensure a meandering flow within the housing. The device enables improved disinfection and can be designed to be more space-saving and visually appealing than conventional devices.

19 Claims, 4 Drawing Sheets

(51) Int. Cl.
*C02F 1/78* (2006.01)
*C02F 103/42* (2006.01)

(52) U.S. Cl.
CPC .... *C02F 2103/42* (2013.01); *C02F 2201/328* (2013.01); *C02F 2201/3227* (2013.01); *C02F 2201/3228* (2013.01); *C02F 2201/782* (2013.01); *C02F 2201/784* (2013.01); *C02F 2301/028* (2013.01); *C02F 2303/04* (2013.01)

(56) References Cited

U.S. PATENT DOCUMENTS

| | | | | |
|---|---|---|---|---|
| 4,230,571 | A | * | 10/1980 | Dadd ................. C02F 1/325 210/760 |
| 5,019,256 | A | * | 5/1991 | Ifill ................. B01J 19/123 210/192 |
| 5,725,757 | A | * | 3/1998 | Binot ................. A61L 2/10 210/105 |
| 5,753,106 | A | * | 5/1998 | Schenck ............... B01J 19/123 210/185 |
| 5,780,860 | A | | 7/1998 | Gadgil et al. |
| 5,785,845 | A | | 7/1998 | Colaiano |
| 6,280,615 | B1 | | 8/2001 | Phillips et al. |
| 2005/0163648 | A1 | | 7/2005 | Liang |
| 2007/0012883 | A1 | | 1/2007 | Lam |
| 2009/0001029 | A1 | | 1/2009 | Denkewicz, Jr. et al. |

FOREIGN PATENT DOCUMENTS

| | | |
|---|---|---|
| WO | 98/41315 A1 | 9/1998 |
| WO | 2013/034890 A2 | 3/2013 |
| WO | 2013/155283 A1 | 10/2013 |

OTHER PUBLICATIONS

Written Opinion in application No. PCT/AT2015/050018 dated Jun. 2, 2015.

* cited by examiner

Section A-A

Section I-I

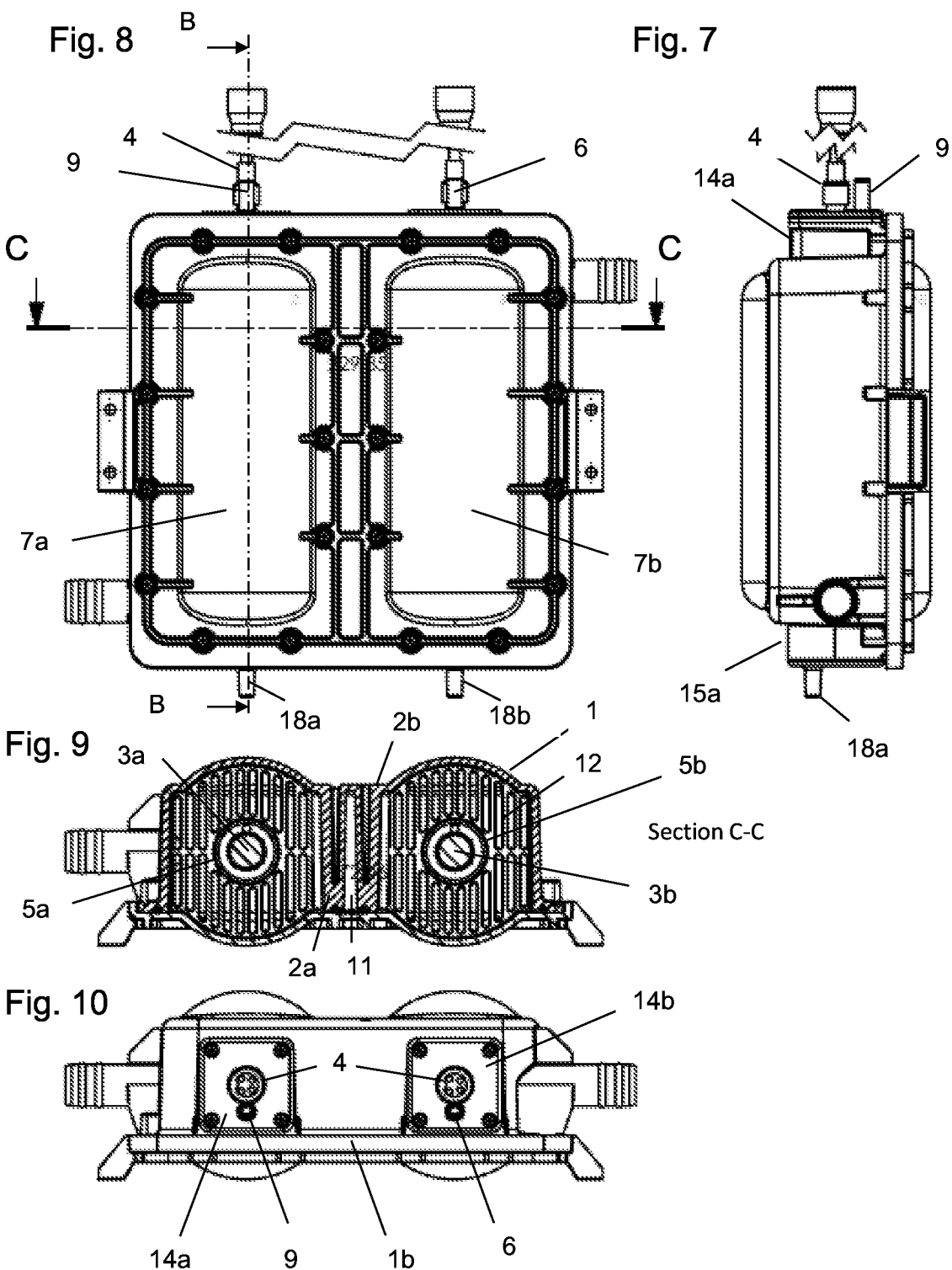

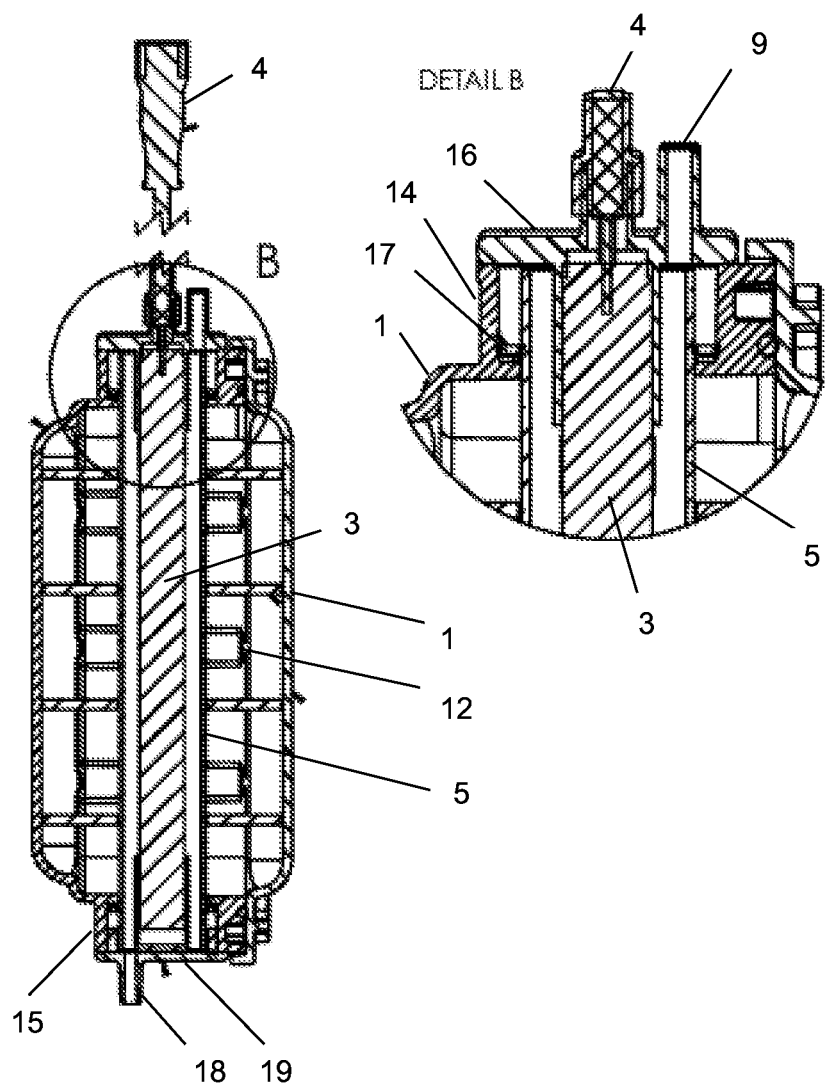

DEVICE FOR DISINFECTING WATER

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

BACKGROUND OF THE INVENTION

Field of the Invention

The invention relates to a device for disinfecting water of a swimming pool, comprising an inlet for water from the swimming pool and an outlet for the water, an ozonation device, and a mixing section for ozone-containing water, wherein the ozonation device comprises at least one UV light source for generating ozone, and an admixing unit for admixing the generated ozone to the water of the inlet.

Description of Related Art

The admixing of chlorine-containing disinfecting agents is used for disinfecting water of a swimming pool, especially of so-called whirlpools. The use of ozone is known as an alternative to or in addition of the chlorination of the pool water. Ozone is a highly effective disinfecting agent, and in contrast to chlorine it is virtually odourless. Ozone can be formed for example by ultraviolet light (UV light) of suitable frequency in that an air flow is guided past the UV light source in order to split the oxygen molecule contained in the air into elementary oxygen at first and to subsequently form ozone by adding the elementary oxygen to molecular oxygen. This process is realised in terms of apparatus by means of an ozone generator for example, in that the UV light source is surrounded by a gas-tight casing in which the air flow is guided and is subjected to the ultraviolet light. The air flow enriched with ozone then leaves the ozone generator and is supplied to an admixing unit which mixes the air flow enriched with ozone in the inlet to the water to be disinfected. The admixing unit can be formed as a Venturi nozzle for example. The ozone generator is conventionally formed as a separate unit which is connected to the inlet via the admixing unit. The ozone generator with the admixing unit will also be referred to below as an ozonation device. Conventional embodiments of an ozonation device are described for example in U.S. Pat. No. 4,230,571 and WO 2013/155283.

Air bubbles are formed in the water flow after the admixing of the ozone-containing air flow to the water flow, on the surfaces of which the disinfecting action occurs, in that the ozone contained in the air bubble oxidises the impurities contained in the water flow. This process is promoted by good thorough mixing of the air bubbles with the water flow and by reducing the size of the air bubbles. A mixing section therefore follows the admixing unit of the inlet, in which the ozone-containing water is thoroughly mixed so as to support the disinfecting effect of the ozone before the water is supplied to the swimming pool again. The term "ozone-containing water" refers to the water flow after the admixture of the ozone-containing air flow, irrespective of whether the ozone is present within the injected air bubbles in the water flow or is dissolved in the water flow. The mixing section is mostly formed in a conventional manner as an extended hose line, which is rolled up or arranged in a meandering manner to reduce the need for space. It is understood that the disinfecting effect of the ozone also continues after leaving the mixing section as long as sufficient quantities of ozone are present, e.g. in the swimming pool itself, where ozone dissolved in the water will usually degasify and leave the water.

The disinfecting effect of the ozone is unsatisfactory in known configurations, so that additional chlorination usually cannot be avoided. Furthermore, the mixing section which is formed in form of an extended hose line requires a respective amount of space and represents a visually unappealing component of conventional swimming pools. It is a further disadvantage that the proper function of the components provided for disinfection can hardly be verified, so that it is necessary to use indirect parameters such as the pH value of the pool water. In practice however, inadequate disinfection of the pool water is often only determined on the basis of visible impairments to the pool water, i.e. at a point in time where the swimming pool should no longer be used.

BRIEF SUMMARY OF THE INVENTION

It is therefore the object of the invention to provide a device for the disinfection of water of a swimming pool which allows improved disinfection and can be formed in a space-saving and more visually pleasing manner than conventional devices.

These objects are achieved by the features embodiments described herein. An embodiment relates to a device for disinfecting water of a swimming pool, comprising an inlet for water from the swimming pool and an outlet for the water, an ozonation device, and a mixing section for ozone-containing water, wherein the ozonation device comprises at least one UV light source for generating ozone, and an admixing unit for admixing the generated ozone to the water of the inlet, and the mixing section comprises a housing which is connected to the inlet, wherein the at least one UV light source is arranged within the housing so as to emit UV light into the housing interior. It is proposed in accordance with the invention that the housing has two deflecting surfaces for the water which protrude into the housing interior, which form a first housing chamber, a second housing chamber and a flow channel located between the deflecting surfaces within the housing, wherein to ensure a meandering flow within the housing the inlet opens into a lower region of the first housing chamber, the first housing chamber opens in an upper region into an upper end of the flow channel, the flow channel opens with its lower end into a lower region of the second housing chamber and the second housing chamber opens into an outlet in an upper region, and within the first housing chamber and the second housing chamber in each case a UV light source provided with a casing and crossing the respective housing chamber is arranged, wherein the casings of the two UV light sources are connected to one another via an air flow channel which has a suction opening for air and a discharge opening connected to the admixing unit. The deflecting surfaces protruding into the housing interior allow an extension of the mixing section at given housing dimensions on the one hand and amplify the turbulence of the water flow on the other hand. Both effects improve the contact of the water with ozone and thus the disinfecting effect. The housing thus forms a mixing chamber for the water enriched with ozone. As a result of arranging the UV light sources within the housing with an emission of the UV light into the water-conducting housing interior and thus directed towards the water, the disinfecting effect is amplified because the UV light also acts directly in a disinfecting manner. The UV light source is thus not only used for generating ozone, but also used for the direct disinfection of the water, so that improved disinfection can be achieved at the same electrical power consumption for the operation of the UV light source.

Since the inlet opens into a lower region of the first housing chamber, the first housing chamber opens in an upper region into an upper end of the flow channel, the flow channel with its lower end opens into a lower region of the second housing chamber and the second housing chamber opens in an upper region into an outlet, a meandering flow of water is ensured, in which water coming from inlet first flows upward within first housing chamber, flows downward within the flow channel, and flows upward within second housing chamber again in the direction of the outlet. The ozone-containing water supplied via the inlet contains air bubbles which have formed in the admixing unit. Due to the buoyancy in the first housing chamber, these air bubbles strive upwards and thus follow the upward water flow. The air bubbles are thus carried along with the water flow and in large numbers also reach the flow channel and the second housing chamber. This ensures a good mixing of the water with ozone and thus an optimal disinfection of the water along the entire mixing section. It should be noted, however, that there may also be additional housing chambers which are located upstream of the first housing chamber and/or downstream of the second housing chamber. According to invention, at least one section is provided within the housing in any case, which section shows the described flow guidance, in which water at first flows upward within a first housing chamber, flows downward within the flow channel, and flows upward within second housing chamber again in the direction of the outlet. A multiplication is also possible in that the section according to the invention, which comprises a first housing chamber in which the ozone-containing water flows upwards, a flow channel in which the ozone-containing water flows downwards, and a second housing chamber in which the ozone-containing water flows upwards again, is repeated twice, three times or even more often by stringing together the outlet of an upstream section forming the inlet of a downstream section.

Within the first housing chamber and the second housing chamber there is arranged in each case a UV light source provided with a casing and crossing the respective housing chamber, wherein the casings of the two UV light sources are connected to one another via an air flow channel which has a suction opening for air and a discharge opening connected to the admixing unit. The casing concerns a gas-tight casing for guiding the air flow. The same air flow is thus guided several times past the UV light sources, so that the air flow is increasingly enriched with ozone until it leaves the housing via the discharge opening and is supplied to the admixing unit. Due to the arrangement of the casings and thus the UV light sources within the water flow, the emission of the UV light over the entire solid angle can be used to disinfect the water.

This effect is intensified, as preferably the casings within the respective housing chamber extend from an upper side face of each housing chamber to a lower side face of each housing chamber. The casing per se is preferably arranged in a watertight manner within the housing, and the UV light source is exchangeably arranged within the casing. An exchange of the casing can occur without having to empty the housing.

For improving the turbulences, swirling plates can further be arranged within the housing, which swirling plates cross the water flow formed by the deflecting surfaces and are provided with water passage openings in the crossing regions.

In accordance with a constructively simple and advantageous embodiment, it is also preferably proposed that an upper and a lower connection flange be provided on the outside of the housing for each housing chamber, in which the casing of the UV light source arranged in the respective housing chamber is kept watertight, wherein the upper connection flange is provided with a cover plate in each case, to which the UV light source is fixed and insertable into the casing, and the cover plate of a first upper connection flange has the discharge opening of the air flow channel connected to the admixing unit, the second upper connection flange has the suction opening of the air flow channel, and the two lower connection flanges are connected via a connecting channel. On the one hand, this solution allows an embodiment with a simple constructive design of the air flow channel, which is formed by the inlet opening, the two casings, the connecting channel and the discharge opening, wherein the connecting channel extends outside the first and second housing chambers. This embodiment also allows the casings to be kept watertight in their end areas in the end flanges, for example using suitable seals. These seals can be positioned at the end of the casings in such a way that they are outside the emission range of the UV light sources, so that they are exposed to UV radiation as little as possible. UV light can damage seals during long exposure times, so that they have to be replaced. The proposed arrangement can reduce damage to the seals caused by UV light so that the seals do not need to be replaced until later or at all.

The invention also relates to a swimming pool with a device in accordance with the invention.

BRIEF DESCRIPTION OF THE SEVERAL VIEWS OF THE DRAWINGS

The invention will be explained below in closer detail by reference to an embodiment example shown in the enclosed drawings, wherein:

FIG. 7 shows the embodiment of the housing of FIG. 6 as seen from the side with a view to the inlet, FIG. 8 shows the embodiment of the housing of FIG. 6 as seen from the side with a view to the housing cover, FIG. 9 shows a sectional view according to the sectional plane C-C in the representation according to FIG. 8, FIG. 10 shows the embodiment of the housing of FIG. 6 as seen from above with a view to the upper connection flanges, FIG. 11 shows a sectional view according to the sectional plane B-B in the representation according to FIG. 8, and FIG. 12 shows a detailed view of "Detail B" of FIG. 11.

DETAILED DESCRIPTION OF THE INVENTION

Figure 1:
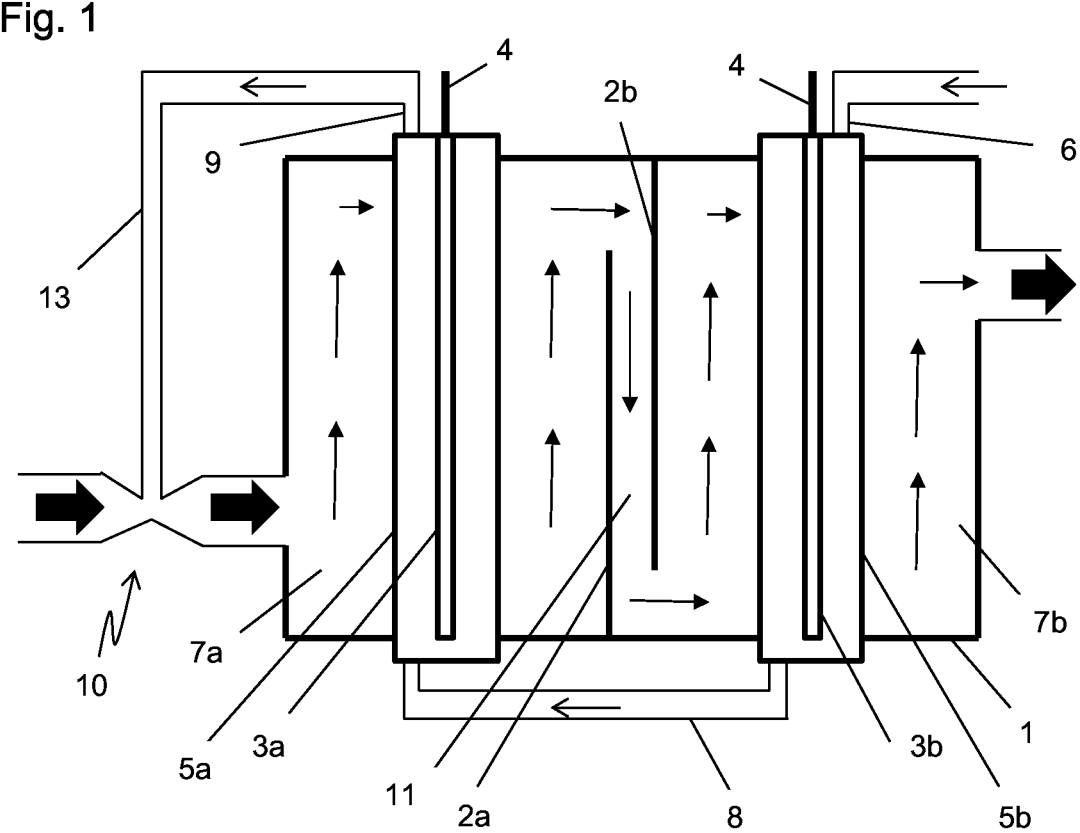
FIG. 1 shows a schematic view of an embodiment of the device in accordance with the invention.
Figure 2:
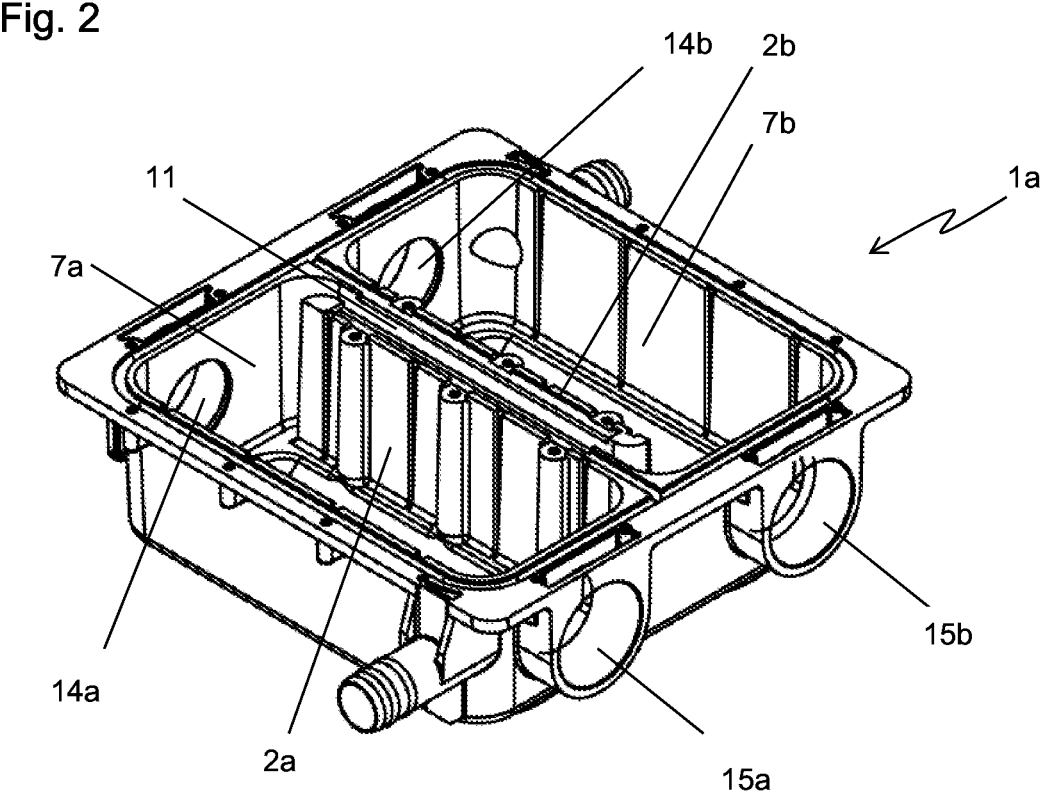
FIG. 2 shows a perspective view of an embodiment of the housing base of a device in accordance with the invention.

An embodiment of the device in accordance with the invention is explained by reference to FIG. 1. The device comprises a housing 1 with an inlet for the water to be disinfected, which is shown in FIG. 2 in inflow on the right side of the housing 1. In the housing interior, the housing 1 has two deflecting surfaces 2a, 2b, which form a first housing chamber 7a, a second housing chamber 7b and a flow channel 11 disposed between the deflecting surfaces 2a, 2b inside the housing 1 and ensure a meandering flow for the incoming water within the housing 1 with high turbulence. The progression of the flow is indicated in FIG. 1 with arrows shown in within the housing 1, and represents the mixing section in which a major part of the disinfection of the water occurs. In the first housing chamber 7a the water coming from the inlet first flows upwards, in the flow channel 11 downwards, and in the second housing chamber 7b again upwards in the direction of the outlet. The ozone-containing water supplied via the inlet contains air bubbles which have formed in the admixing unit 10. Due to the buoyancy in the first housing chamber 7a, these air bubbles strive upwards and thus follow the upward water flow. The air bubbles are thus carried along with the water flow and reach the flow channel 11 and the second housing chamber 7b in large numbers. This ensures good mixing of the water with ozone along the entire mixing section. In order to increase the structural stability of the housing, a stiffening body 12 can also be arranged inside the housing (see FIG. 9, for example; not shown in FIG. 1). In order to increase the turbulence of the occurring water flow, swirling plates can further be arranged in the housing interior, which swirling plates cross the water flow formed by the deflecting surfaces and are provided in the crossing regions with water passage openings.

Inside the first housing chamber 7a and the second housing chamber 7b a UV light source 3a, 3b is arranged in each case, which is provided with a casing 5a, 5b and crosses the respective housing chamber 7a, 7b. The UV light sources 3a, 3b each have a power supply 4 and can be inserted into the respective casing 5a, 5b assigned to them. The casings 5a, 5b of the two UV light sources 3a, 3b are arranged watertight inside the housing 1 and have an approximately tubular shape, wherein they are flushed by the water flow occurring inside the housing. The UV light sources 3 show an emission of the UV light directed into the interior of the housing, so that an exposure of the water flow guided inside the housing 1 is provided by the UV light emitted by the UV light sources 3.

The casings 5a, 5b of the two UV light sources 3a, 3b are also connected to each other via a connecting channel 8. The right-hand casing 5b shown in FIG. 1 has a suction opening 6 for ambient air, and the left-hand casing 5a shown in FIG. 1 has a discharge opening 9 which is connected to the admixing unit 10 via admixing channel 13. The suction opening 6, the two casings 5b, 5a, the connecting channel 8, the discharge opening 9 and the admixing channel 13 form a gas-tight closed air flow channel from the suction opening 6 to the admixing unit 10, wherein the connecting channel 8 in the embodiment example shown is guided outside the two housing chambers 7a, 7b. The arising progression of flow within the air flow channel is indicated in FIG. 1 by arrows pointing to the left. The air aspirated through the suction opening 6 into the right-hand casing 5b first flows around the right-hand UV light source 3b shown in FIG. 1 and finally reaches the lower region of the right-hand casing 5b, which is connected to the lower region of the left-hand casing 5a shown in FIG. 1 via a connecting channel 8. The aspirated air continues to flow around the left-hand UV light source 3a shown in FIG. 1 and finally reaches the upper region of the left-hand casing 5a shown in FIG. 1, which is connected to the admixing channel 13 via a discharge opening 9. The aspirated ambient air is increasingly enriched with ozone in the course of this flow section, said ozone being formed as a result of the radiation with the UV light emitted by the UV light sources 3. The air enriched with ozone is supplied via the discharge opening 9 and the admixing channel 13 to the admixing unit 10, which can be formed as a Venturi nozzle for example and is only shown schematically in FIG. 2. The air enriched with ozone is supplied via the admixing unit 10 to the water flow in the inlet of the housing 1.

Figure 3:
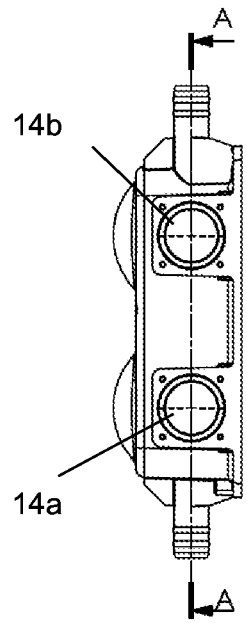
FIG. 3 shows the embodiment of the housing base of FIG. 2 as seen from above with a view to the upper connection flanges.
Figure 4:
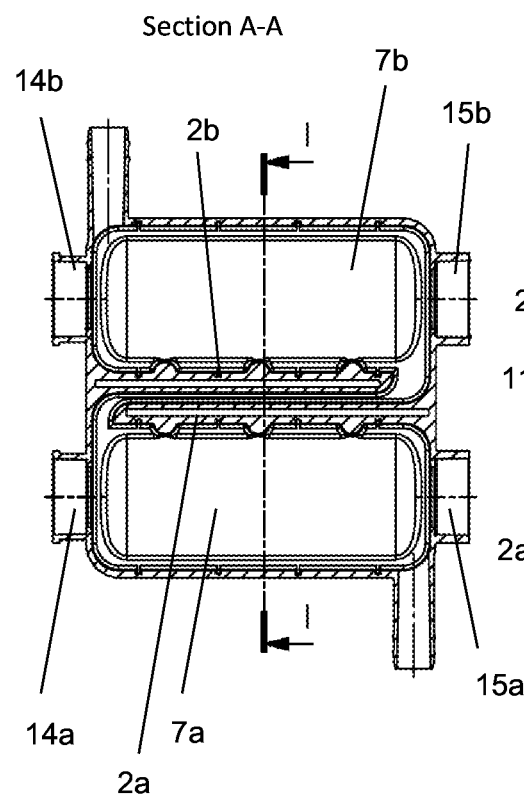
FIG. 4 shows a sectional view according to the sectional plane A-A in the representation according to FIG. 3.
Figure 5:
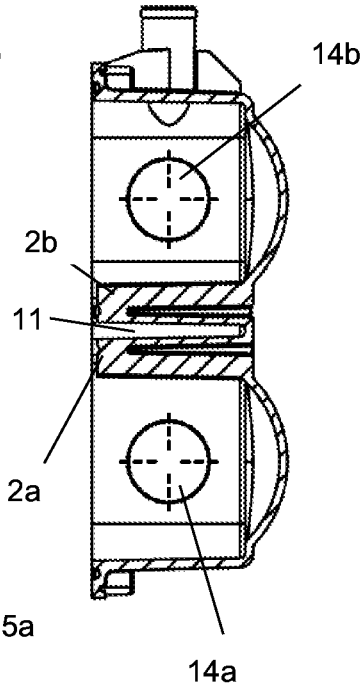
FIG. 5 shows a sectional view according to the sectional plane I-I in the representation according to FIG. 4.

A possible constructive implementation of the housing 1 of a device according to the invention is explained on the basis of FIGS. 2 to 12. Housing 1 comprises a housing base 1a and a housing cover 1b, wherein FIGS. 2 to 5 initially refer only to housing base 1a. FIG. 3 shows the embodiment of the housing base of FIG. 2 seen from above with a view to the upper connection flanges 14a, 14b, and FIG. 4 shows a sectional view in accordance with the sectional plane A-A in the illustration in accordance with FIG. 3. In particular, the deflecting surfaces 2a, 2b are visible, which form a first housing chamber 7a, a second housing chamber 7b and a flow channel 11 between the deflecting surfaces 2a, 2b within the housing 1. The flow channel 11 is clearly visible in FIG. 5, which shows a sectional view according to the sectional plane I-I in the representation according to FIG. 4. In addition to the upper connection flanges 14a and 14b, FIG. 4 also shows the lower connection flanges 15a and 15b.

Figure 6:
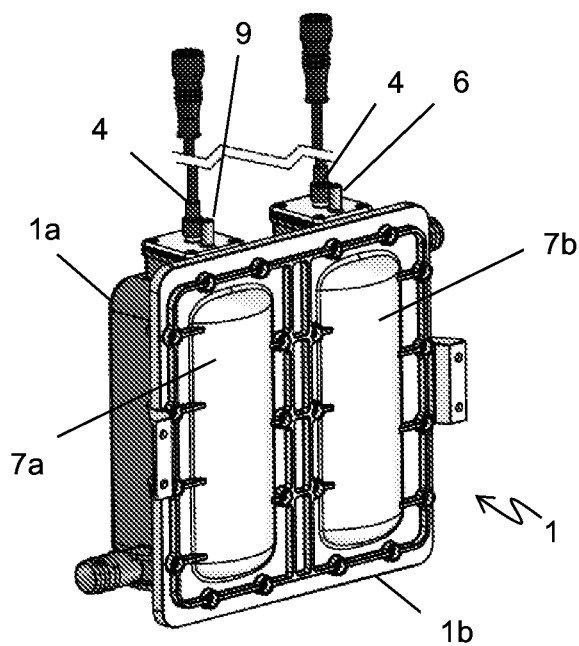
FIG. 6 shows a perspective view of an embodiment of the housing of a device according to the invention.

FIG. 6 shows a perspective view of an embodiment of the housing 1 of a device according to the invention, in which the housing base 1a is covered with a housing cover 1b, which is screwed to the housing base 1a, for example. The connections for the power supply 4 of the UV light sources 3 are also visible, as well as the suction opening 6 and the discharge opening 9. The housing cover 1b can be provided with transparent sections for visual inspection of the interior of the housing to enable visual inspection of the water flow, the formation of bubbles within the water flow and the function of the UV light sources 3. The UV light sources 3 not only support the disinfection of the water, but also ensure sufficient illumination of the interior of the housing to enable the aforementioned visual inspection.

FIG. 7 shows the embodiment of the housing of FIG. 6 seen from the side with a view to the inlet, wherein a connection for the power supply 4 of the UV light source 3a, the discharge opening 9, the upper connection flange 14a of the first housing chamber 7a as well as its lower connection flange 15*a* are visible. FIG. 8 shows the embodiment of the housing of FIG. 6 as seen from the side with a view of the housing cover 1*b*.

FIG. 9 shows a sectional view according to the sectional plane C-C in the illustration according to FIG. 8, wherein in particular the stiffening body 12 is visible, which structurally stabilizes the housing 1 against external loads. In the embodiment shown, the stiffening body has 12 ribs supported on the inside of housing 1 and on the outside of casing 5, through which water can flow. FIG. 10 shows the embodiment of the housing 1 of FIG. 6 as seen from above with a view of the upper connection flanges 14*a* and 14*b*. Furthermore, the suction opening 6 and the discharge opening 9 are shown in FIG. 10.

FIG. 11 shows a sectional view according to section plane B-B in the illustration according to FIG. 8, and FIG. 12 shows a detailed view of "Detail B" of FIG. 11 to explain a possible attachment of the casing 5 to the upper connection flange 14. Casing 5 is held in the upper connection flange 14 in an inwardly protruding projection narrowing in the cross-section, to which casing 5 is attached in a watertight manner via a seal 17. The UV light source 3 is attached to a connection plate 16, which also has a supply for the power supply 4, as well as the discharge opening 9 in the case of the first upper connection flange 14*a* of the first housing chamber 7*a*, and the suction opening 6 in the case of the second upper connection flange 14*b* of the second housing chamber 7*b*. The suction opening 6 opens into the casing of the UV light source 3*a* of the first housing chamber 7*a*, and the suction opening 6 into the casing of the UV light source 3*b* of the second housing chamber 7*b*. During assembly, the UV light source 3 can be inserted into its associated casing 5, with the connection plate 16 coming to lie on the upper edge of the casing 5. The connection plate 16 can then be screwed to the upper connection flange 14.

The lower connection flange 15 can be designed to form a receptacle for the casing 5, wherein the casing 5 is also held in the lower connection flange 15 in an inwardly protruding projection narrowing in the cross-section, to which the casing 5 is fastened in a watertight manner via a seal 17. The lower edge of the casing 5 rests on an end plate 19, which closes the lower connection flange 15 and has a connection piece 18 for connecting channel 8. The end plate 19 can, for example, be screwed onto the lower connection flange 15. A first connection piece 18*a* opens into the casing of the UV light source 3*a* of the first housing chamber 7*a*, and a second connection piece 18*b* into the casing of the UV light source 3*b* of the second housing chamber 7*b*, wherein the two connection pieces 18*a*, 18*b* are connected via connecting channel 8.

The deflecting surfaces 2 protruding into the housing interior allow an extension of the mixing section under given housing dimensions on the one hand and amplify the turbulence of the water flow on the other hand. Both effects improve the contact of the water with ozone and thus the disinfecting effect. The disinfecting effect is amplified by the arrangement of the UV light sources 3 within the housing 1 with an emission of the UV light directed into the housing interior, so that improved disinfection can be produced at the same electrical power consumption for operating the UV light sources 3.

A device for the disinfection of water of a swimming pool is provided by means of the invention which allows improved disinfection and can be arranged in a more space-saving and visually appealing manner than in conventional devices.

The invention claimed is:

1. A device for disinfecting water of a swimming pool, comprising:
   an inlet for the water from the swimming pool and an outlet for the water and a water flow from the inlet to the outlet,
   an ozonation device, and
   a mixing section for ozone-containing water, wherein:
     the ozonation device includes at least one UV light source for generating ozone, and an admixing unit for admixing the ozone to the water of the inlet,
     the mixing section comprises a housing which is connected to the inlet,
     the at least one UV light source is arranged within the housing so as to emit UV light directed into a housing interior,
     the housing has two deflecting surfaces for the water which protrude into the housing interior, which form a first housing chamber, a second housing chamber and a flow channel located between the two deflecting surfaces within the housing, wherein:
       to ensure a meandering of the water flow within the housing the inlet opens into a lower region of the first housing chamber, the first housing chamber opens in an upper region into an upper end of the flow channel, the flow channel opens with a lower end into a lower region of the second housing chamber and the second housing chamber opens into an outlet in an upper region of the second housing chamber, and within the first housing chamber and the second housing chamber in each case a UV light source of the at least one UV light source is provided with a casing and crossing the respective housing chamber, and
     the casings of the UV light sources in the first housing chamber and second housing chamber are connected to one another via an air flow channel which has a suction opening for air and a discharge opening connected to the admixing unit,
   wherein the housing comprises a housing base and a housing cover with the casings of the UV light sources being held in upper connection flanges and lower connection flanges of the housing base, wherein the upper connection flanges are formed into an upper end of the housing base and the lower connection flanges are formed into a lower end of the housing base opposite of the upper end of the housing base, and the housing base is covered with the housing cover.

2. A device according to claim 1, wherein the casings within the respective housing chamber each extend from an upper side surface of the respective housing chamber to a lower side surface of the respective housing chamber.

3. A device according to claim 1, wherein the casings of the UV light sources which are arranged within the housing are arranged in a watertight manner within the housing, and the UV light sources are exchangeably arranged within the respective casing.

4. A device according to claim 1, wherein:
   the upper connection flanges and the lower connection flanges are provided on the outside of the housing for each housing chamber, in which the casing of the UV light source arranged in the respective housing chamber is held in a watertight manner,
   the upper connection flanges are provided in each case with a cover plate, to which the UV light source is fixed and insertable into the casing in the respective housing chamber, the cover plate of a first upper connection flange of the upper connection flanges includes the discharge opening of the air flow channel connected to the admixing unit, the cover plate of a second upper connection flange of the upper connection flanges has the suction opening of the air flow channel, and the lower connection flanges are connected via a connecting channel.

5. A device according to claim 1, wherein the housing base includes the first housing chamber and second housing chamber formed therein.

6. A device according to claim 5, wherein a first upper connection flange of the upper connection flanges is in an upper end of the first housing chamber and a second upper connection flange of the upper connection flanges is in an upper end of the second housing chamber.

7. A device according to claim 6, wherein a first lower connection flange of the lower connection flanges is in a lower end of the first housing chamber and a second lower connection flange of the lower connection flanges is in a lower end of the second housing chamber.

8. A device according to claim 7, wherein the first housing chamber is formed as a recess in the housing base.

9. A device according to claim 8, wherein the second housing chamber is formed as a recess in the housing base.

10. A device according to claim 9, wherein the housing cover covers the first housing chamber and second housing chamber.

11. A swimming pool having a device for disinfecting water of the swimming pool, comprising:
  an inlet for the water from the swimming pool and an outlet for the water and a water flow from the inlet to the outlet,
  an ozonation device, and
  a mixing section for ozone-containing water, wherein:
    the ozonation device includes at least one UV light source for generating ozone, and an admixing unit for admixing the ozone to the water of the inlet,
    the mixing section includes a housing which is connected to the inlet,
    the at least one UV light source is arranged within the housing so as to emit UV light directed into a housing interior,
    the housing has two deflecting surfaces for the water which protrude into the housing interior, which form a first housing chamber, a second housing chamber and a flow channel located between the two deflecting surfaces within the housing, wherein:
      to ensure a meandering of the water flow within the housing the inlet opens into a lower region of the first housing chamber, the first housing chamber opens in an upper region into an upper end of the flow channel, the flow channel opens with a lower end into a lower region of the second housing chamber and the second housing chamber opens into an outlet in an upper region of the second housing chamber, and within the first housing chamber and the second housing chamber in each case a UV light source of the at least one UV light source is provided with a casing and crossing the respective housing chamber, and
      the casings of the UV light sources in the first housing chamber and second housing chamber are connected to one another via an air flow channel which has a suction opening for air and a discharge opening connected to the admixing unit,
    wherein the housing comprises a housing base and a housing cover with the casings of the UV light sources being held in upper connection flanges and lower connection flanges of the housing base, wherein the upper connection flanges are formed into an upper end of the housing base and the lower connection flanges are formed into a lower end of the housing base opposite of the upper end of the housing base, and the housing base is covered with the housing cover.

12. A swimming pool according to claim 11, wherein the casings within the respective housing chamber each extend from an upper side surface of the respective housing chamber to a lower side surface of the respective housing chamber.

13. A swimming pool according to claim 11, wherein the casings of the UV light sources arranged within the housing are arranged in a watertight manner within the housing, and the UV light sources are exchangeably arranged within the respective casing.

14. A swimming pool according to claim 11, wherein:
  the upper connection flanges and the lower connection flanges are provided on the outside of the housing for each housing chamber, in which the casing of the UV light source arranged in the respective housing chamber is held in a watertight manner,
  the upper connection flanges are provided in each case with a cover plate, to which the UV light source is fixed and insertable into the casing in the respective housing chamber,
  the cover plate of a first upper connection flange of the upper connection flanges includes the discharge opening of the air flow channel connected to the admixing unit,
  the cover plate of a second upper connection flange of the upper connection flanges has the suction opening of the air flow channel, and
  the lower connection flanges are connected via a connecting channel.

15. A swimming pool according to claim 11, wherein the housing base includes the first housing chamber and second housing chamber formed therein.

16. A swimming pool according to claim 15, wherein a first upper connection flange of the upper connection flanges is in an upper end of the first housing chamber and a second upper connection flange of the upper connection flanges is in an upper end of the second housing chamber.

17. A swimming pool according to claim 16, wherein a first lower connection flange of the lower connection flanges is in a lower end of the first housing chamber and a second lower connection flange of the lower connection flanges is in a lower end of the second housing chamber.

18. A swimming pool according to claim 17, wherein the first housing chamber is formed as a recess in the housing base, and the second housing chamber is formed as a second recess in the housing base.

19. A swimming pool according to claim 18, wherein the housing cover covers the first housing chamber and second housing chamber.

* * * * *